(12) United States Patent
Orlewski et al.

(10) Patent No.: US 7,726,207 B2
(45) Date of Patent: Jun. 1, 2010

(54) PRESSURE SENSING MAT

(75) Inventors: Pierre Orlewski, Ettlebruck (LU); Patrick Di Mario-Cola, Fontoy (FR)

(73) Assignee: IEE International Electronics & Engineering S.A. (LU)

( * ) Notice: Subject to any disclaimer, the term of this patent is extended or adjusted under 35 U.S.C. 154(b) by 108 days.

(21) Appl. No.: 12/279,820

(22) PCT Filed: Feb. 2, 2007

(86) PCT No.: PCT/EP2007/051037
§ 371 (c)(1),
(2), (4) Date: Aug. 18, 2008

(87) PCT Pub. No.: WO2007/093511
PCT Pub. Date: Aug. 23, 2007

(65) Prior Publication Data
US 2009/0013802 A1    Jan. 15, 2009

(30) Foreign Application Priority Data
Feb. 16, 2006   (EP) .................................. 06110042

(51) Int. Cl.
*G01D 7/00*  (2006.01)
(52) U.S. Cl. ............................. 73/862.046; 73/862.041
(58) Field of Classification Search ................. 73/862.041–862.046, 760–860
See application file for complete search history.

(56) References Cited

U.S. PATENT DOCUMENTS

| | | | |
|---|---|---|---|
| 4,839,512 A | 6/1989 | Speck et al. | |
| 6,360,612 B1 * | 3/2002 | Trantzas et al. | 73/753 |
| 6,977,592 B2 * | 12/2005 | Orlewski | 340/667 |
| 7,277,267 B1 * | 10/2007 | Bonin | 361/290 |
| 7,373,843 B2 * | 5/2008 | Ganapathi et al. | 73/862.046 |
| 2003/0037966 A1 | 2/2003 | Sandbach | |
| 2003/0141983 A1 | 7/2003 | Schmiz et al. | |
| 2004/0049363 A1 * | 3/2004 | Shimizu et al. | 702/139 |
| 2008/0202251 A1 * | 8/2008 | Serban et al. | 73/780 |

FOREIGN PATENT DOCUMENTS

| | | |
|---|---|---|
| DE | 3513360 | 10/1986 |
| EP | 1492136 | 12/2004 |
| WO | 9939168 | 8/1999 |
| WO | 0186676 | 11/2001 |

OTHER PUBLICATIONS

International Search Report PCT/EP2007/051037 Dated Mar. 14, 2003.

* cited by examiner

*Primary Examiner*—Max Noori
(74) *Attorney, Agent, or Firm*—Cantor Colburn LLP

(57) ABSTRACT

A generally flexible pressure sensing mat for a vehicle seat includes a first carrier foil and a second carrier foil arranged at a certain distance from each other by means of a spacer. The mat includes a plurality of cells, each cell being defined by a respective opening of the spacer. In each cell, at least two electrodes are arranged between the first and second carrier foils and, in response to pressure acting on the pressure sensing mat at a cell, the first and second carrier foils are pressed together against the reaction force of the carrier foils thereby causing variation of an electrical resistance between the at least two electrodes of the cell. The pressure sensing mat includes at least one rigidifying element, the least one rigidifying element being associated to an individual cell for locally reducing flexibility of the pressure sensing mat at the individual cell.

12 Claims, 1 Drawing Sheet

PRESSURE SENSING MAT

TECHNICAL FIELD OF THE INVENTION

The invention relates to a pressure sensing mat, in particular to a generally flexible pressure sensing mat for a vehicle seat.

BRIEF DISCUSSION OF RELATED ART

Modern vehicles are generally equipped with a protection system comprising several airbags and seat belt pretensioners. In order to deploy the airbags of the passenger seat only in the case where this seat is actually occupied by a person, passenger detectors have been developed that indicate the presence of a passenger to the control unit of the protection system. Other detectors have been developed which are used to evaluate the weight or the position of the occupant of the seat, this information enabling the control unit to deploy the airbag in a mode, which is adapted to the actual occupancy status of the seat.

Detectors for detecting and evaluating the occupancy states of a vehicle often comprise a foil type pressure sensing mat, which is integrated in the vehicle seat, e.g. in the seat foam or between the seat foam and the seat trim. Such a pressure sensing mat comprises a plurality of individual pressure sensors arranged in cells distributed over the seating surface of the seat. The pressure distribution over the surface of the seat can be related to the size or the shape of a person or an object occupying the seat. Based on the pressure acting on the different individual pressure sensors (i.e. the different individual pressure sensing cells), a control unit, e.g. a microprocessor, evaluates a pressure distribution profile on the seat and, based on this pressure profile, switches the airbag in a deployment modus, which is best adapted to the current occupancy status.

Known pressure sensing mats comprise a flexible upper carrier foil and a flexible lower carrier foil arranged at a certain distance from each other by means of a spacer (e.g. a double-sided adhesive foil). The mat is integrated into the seat so as to extend substantially parallel to the seat surface, the upper carrier foil facing towards an occupant who is seated on the seat, the lower carrier foil facing away from them. The spacer, which is sandwiched between the carrier foils, is provided with a plurality of openings devoid of spacer material. The openings define a plurality of cells or cavities in the pressure sensing mat, in each of which at least two electrodes are arranged. The cells and the electric components arranged therein form the individual pressure sensors of the mat. In response to pressure acting on the pressure sensing mat in the region of a cell, the first and second carrier foils are pressed together. This causes the electrical resistance between the at least two electrodes of the cell to drop. A control unit connected to the pressure sensing mat measures the resistance between the electrodes of the cells and thereby determines the pressure acting on the mat at the different locations of the cells. More details on pressure sensing mats can e.g. be found in WO 01/86676 and WO 99/39168.

Several possible arrangements of the electrodes in the individual cells are known. In a first embodiment of the individual pressure sensors, a first electrode is arranged on the first carrier foil and a second electrode is arranged on the second carrier foil in facing relationship with the first electrode. At least one of the electrodes may be covered by a layer of pressure sensitive material, e.g. a semi-conducting material. When the first and second carrier foils are pressed together in response of force acting on the cell, an electrical contact is established between the first and second electrode. If the layer of pressure sensitive material is present on at least one of the electrodes, the electrical resistance between the electrodes varies substantially continuously with pressure once the electrical contact is established. Pressure sensors of this type are frequently called to operate in a so called "through mode". For the purpose of occupancy detection, pressure sensors with a pressure sensitive layer are usually preferred. Typically, the pressure sensing mat comprises a support structure with flexible strips, the individual pressure sensors being arranged by groups of three to six on each flexible strip. Such an open structure of flexible strips enhances the flexibility of the entire pressure sensing mat. As the pressure sensing mat thus adapts itself to deformations of the seat cushion when loaded in such a way that a passenger's seating comfort is not degraded by the presence of the pressure sensing mat.

In an alternative embodiment of the pressure sensors, a first and a second electrode are arranged in spaced relationship on one of the first and second carrier foils while the other carrier foil is covered with a shunt element, e.g. a conductive layer or a layer of pressure sensitive material. The shunt element is arranged in facing relationship to the first and second electrode such that, when said first and second carrier foils are pressed together in response to force acting on the cell, the shunt element shunts the first and second electrode. If the shunt element is made of pressure sensitive material or if at least one of the electrodes comprises a layer of pressure sensitive material, the electrical resistance between the electrodes varies substantially continuously with pressure once the electrical contact is established. Sensors of this type are called to operate in the so-called "shunt mode".

Flexible pressure sensitive mats are manufactured cost-efficiently and they have proven to meet all classification reliability and robustness requirements for seat passengers as defined by the NHTSA FMVSS208 regulation. As NHTSA defines only the most standard seat occupancy scenarios (morphological types of passengers, seating positions and seat adjustments), in real life there can be situations in which a combination of critical factors might influence the classification robustness. In particular, heavy and sharp-angular objects placed on the seat cushion, especially at high temperature, may activate a sensing mat in such a way that discriminating the objects from adult passengers becomes extremely challenging. As the front and side airbag and belt pretensioner deployment strategy differs for adult beings and objects or child seats, additional classification robustness margin is highly desirable.

BRIEF SUMMARY OF THE INVENTION

The invention provides a pressure sensing mat enabling improved classification robustness if used as occupancy sensor.

A generally flexible pressure sensing mat for a vehicle seat is proposed, which comprises a first carrier foil and a second carrier foil arranged at a certain distance from each other by means of a spacer. The mat comprises a plurality of cells, each cell being defined by a respective opening of the spacer. In each cell, at least two electrodes are arranged between the first and second carrier foils and, in response to pressure acting on the pressure sensing mat at a cell, the first and second carrier foils are pressed together, thereby causing variation of an electrical resistance between the at least two electrodes of the cell. According to an important aspect of the invention, the pressure sensing mat comprises at least one rigidifying element, the least one rigidifying element being associated to an individual cell for locally reducing flexibility of the pressure sensing mat at the individual cell. The rigidifying element locally increases the stiffness of the pressure sensing mat in the region of the individual cell. When integrated in the seat, the pressure sensing mat, although generally flexible, thus suffers reduced bending or torsion in the region of the individual cell. This will be highly appreciated as bending or torsion at a cell may cause the first and second carrier foils to approach each other and thereby possibly yielding a pressure reading in the absence of pressure acting on the cell normally, i.e. perpendicular with respect to the carrier foils. Each cell, to which such a rigidifying element is associated, is therefore less responsive to bending effects so that the pressure reading derived from the electrical resistance measured is more accurately related to the weight or pressure acting on the sensor cell normally with respect to the carrier foils.

Indeed, the pressure sensing mat may comprise a plurality of rigidifying elements, each rigidifying element being respectively associated to an individual cell for locally reducing flexibility of the pressure sensing mat at the individual cell. Preferably, a rigidifying element is associated to each cell located in an area expected to be subject to significant bending or flexure when the mat is operationally arranged in the seat, e.g. due to the presence of a CRS. Such areas will be hereinafter referred to as "critical zones". This may be done, for instance, with regard to enhanced classification robustness between the CRS class and the $5^{th}$ percentile female class. Most CRS have a kind of parallel narrow rails at their bottom, which penetrate deeply into the seat cushion when the CRS is correctly secured by the right tension of the seat belt. This results in zones of high bending or flexure. With common pressure sensing mats, bending in these zones is frequently sufficient for activating the individual pressure sensors therein, so that instead of obtaining a pressure profile with showing parallel narrow lines, one obtains a pressure profile that is hardly distinguishable from the pressure profile caused by the legs and the buttocks of a $5^{th}$ percentile female. Associating spot-like rigidifying elements to the pressure sensors in the critical zones of the mat, at the left and right sides of the vehicle seat, substantially reduces the effect of bending on the measured pressure profile without deteriorating the seating comfort. As a consequence, the pressure profile is not or at least significantly less burdened with pressure values from cells activated mainly by bending instead of loading. Therefore, the narrow rails of the CRS can be clearly recognised in the generated pressure profile. With regard to discriminating between the 6-year old child and the $5^{th}$ percentile female seated at the waterfall, rigidifying elements are preferably associated with cells in the front portion of the pressure sensing mat. In this case, the two occupants have similar weight, but the child's buttocks induce much higher bending effect than those of the $5^{th}$ percentile lady. With rigidifying elements in the critical zone of the front portion of the pressure sensing mat the two occupancy states can be reliably discriminated. It shall be noted that outside the critical zones the rigidifying elements may be omitted; alternatively, all individual cells of the pressure sensing mat may be equipped with a rigidifying element.

According to a first embodiment of the invention, the at least one rigidifying element is an integral part of the first carrier foil or the second carrier foil. As regards appearance, the rigidifying element may be an enlargement, e.g. knop- or stud-like enlargement, of one of the carrier foils at the individual cell. According to a second embodiment, the at least one rigidifying element is a rigidifying patch attached to the pressure sensing mat. Whereas the rigidifying element being an integral part of one of the carrier foils requires modifications to the production of the concerned carrier foil, a separate rigidifying patch can be easily attached to a conventionally manufactured pressure sensing mat in an additional production step, e.g. by gluing, bonding, etc.

Such a rigidifying patch can, for instance, be entirely or partially formed of a material like a stiff plastic foil, a resin, a glue, a sealing, a metal, an alloy, a composite material, etc.

The rigidifying patch may be attached to the first carrier foil or the second carrier foil inside of the individual cell, i.e. in the individual cell and on the inner surface of one of the carrier foils that is oriented towards the opposite carrier foil. In this case, the rigidifying patch is arranged between the carrier foil and the electrical components of that carrier foil. Alternatively, the rigidifying patch may be attached to the first carrier foil or the second carrier foil on the outside of the individual cell, i.e. on a portion of the outer surface of one of the carrier foils adjacent to the individual cell.

Advantageously, in a direction parallel to the first and second carrier foils, the at least one rigidifying element has a size corresponding or superior to a size of the associated individual cell. This means that the rigidifying element may have roughly the same size (diameter) as the individual cell (the diameter of which is usually about 2 cm). It is not excluded that the diameter of the rigidifying element may be somewhat larger (e.g. by about 5 to about 50%, more preferably by about 5 to about 25%) than the diameter of the individual cell. It is even preferred that the at least one rigidifying element or patch extends beyond a boundary of the individual cell. This avoids that the edge of the rigidifying element overlaps with the cell, which could cause some sharp bending at the cell itself. Those skilled will appreciate that the pressure sensing mat is only rigidified locally, i.e. in the region of some chosen cells (not necessarily all the cells of the mat). Given that the diameters of the regions centred on the respective cells that are rigidified by the rigidifying elements are small with respect to the bending radius caused by a human occupant, the latter will not or hardly notice the presence of rigidifying elements.

It should be noted that the rigidifying element may have the same shape as the cell to which it is associated, or have a different shape. The shape of the rigidifying element could e.g. be circular, elliptical, star-like, a cross, a grid, etc.

BRIEF DESCRIPTION OF THE DRAWINGS

Preferred embodiments of the invention will now be described, by way of example, with reference to the accompanying drawings in which.

DETAILED DESCRIPTION OF THE INVENTION

Figure 1:
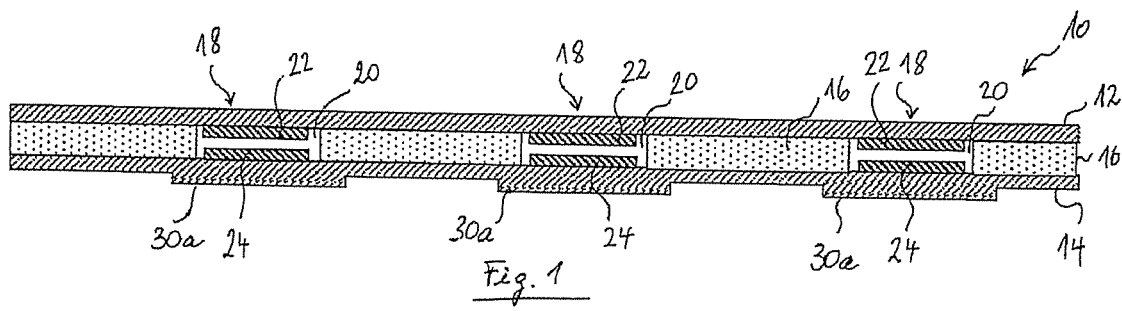
FIG. 1: is a cross sectional schematic view of a portion of a pressure sensing mat according to a first embodiment of the invention.
Figure 2:
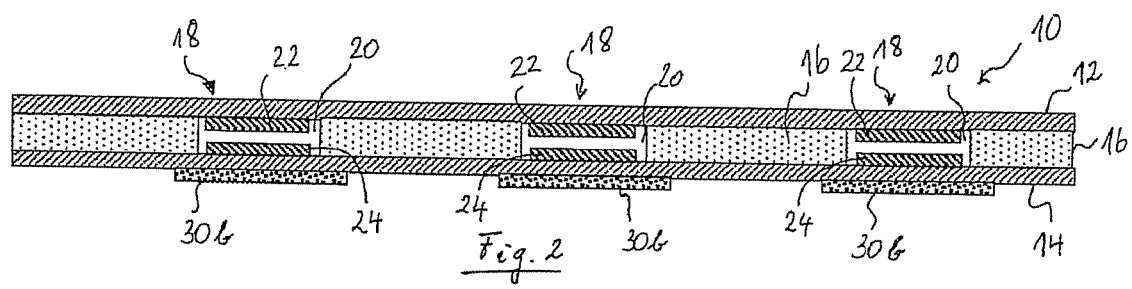
FIG. 2: is a cross sectional schematic view of a portion of a pressure sensing mat according to a first embodiment of the invention.
Figure 3:
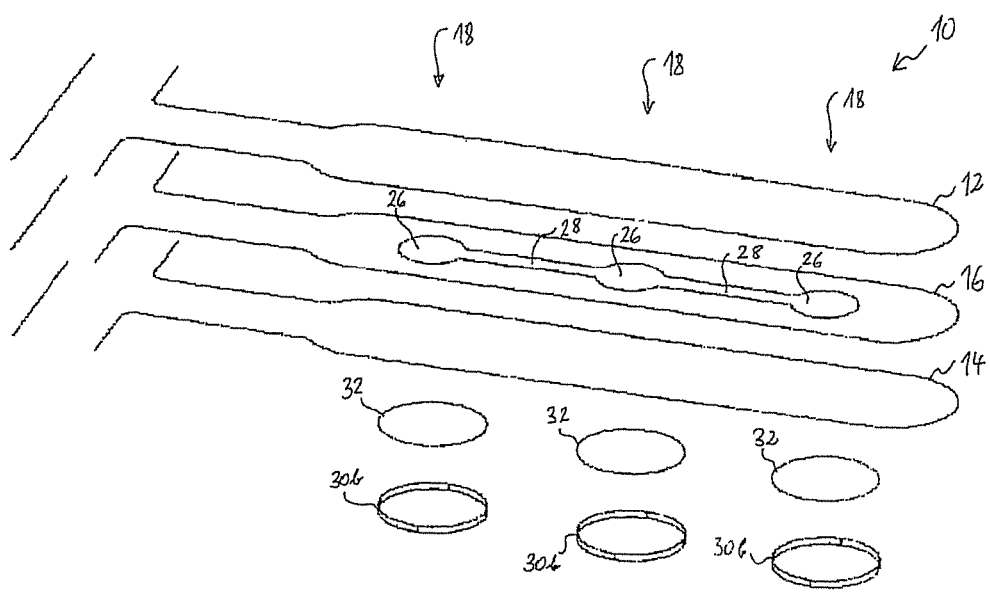
FIG. 3: is an exploded view of the sensing mat portion of FIG. 2.

FIGS. 1 and 2 show cross sectional views through a portion of a pressure sensing mat 10 according to a first, respectively a second embodiment of the invention. The pressure sensing mat 10 comprises first and second generally flexible carrier foils 12, 14. When the mat 10 is integrated into a seat, e.g. between the trim and the foam cushion or within the foam, the first carrier foil 12 faces the seating surface of the seat, whereas the second carrier foil 14 faces away from it. The carrier foils 12, 14 can be made of flexible and pressure resistant materials, e.g. a plastic foil. A flexible but essentially incompressible spacer 16 maintains the first and second carrier foils 12, 14 at a distance from each other. The pressure sensing mat 10 is provided with individual pressure sensors 18 in the form of cells 20 between the carrier foils 12, 14, in each of which at least two electrodes 22, 24 are arranged. Each cell 20 is defined by an opening 26 in the spacer 16, which may be generally circular as shown in FIG. 3, or have any other suitable shape. When pressure is applied to the pressure sensors 18, the first carrier foil 12 is pressed down towards the second carrier foil 14. Thereby, the electrical resistance between the at least two electrodes 22, 24 in the cells changes. The individual cells 20 are interconnected by means of a venting channel 28, which provides for atmospheric compensation and prevents too high an increase of the internal cell pressure due to volume reduction. Individual rigidifying elements 30 are associated to the pressure sensors 18, in order to locally reduce flexibility of the pressure sensing mat 10. In the light of the present disclosure, those skilled will be aware of which material and thickness of the rigidifying element are suitable for enhancing the stiffness of the pressure sensing mat 10 in the regions of the cells 18.

As illustrated in FIG. 1, the rigidifying elements 30 can be local enlargements 30*a* of one of the carrier foils, preferably the lower carrier foil 14. The increased thickness of the carrier foil 14 provides for higher mechanical resistance against bending and/or torsion in the regions of the individual pressure sensors 18.

FIGS. 2 and 3 illustrate a second embodiment of the invention. The individual pressure sensors 18 are provided with rigidifying patches 30*b* attached to one of the carrier foils by means of an adhesive 32, e.g. a double-sided adhesive, glue or resin. Like the local enlargements 30*a* of the embodiment of FIG. 1, the rigidifying patches 30*b* locally reduce the flexibility of the pressure sensing mat 10 at the individual pressure sensors 18.

The rigidifying elements 30 of FIGS. 1 to 3 are arranged substantially concentrically with the individual cells 20 and have about the size and shape of the openings 26 of the spacer 16. The diameter of the rigidifying elements 30 most preferably ranges from 1.05 to 1.25 times the diameter of the cells 20 so that the rigidifying element 30 laterally extends over the boundaries of the cells 20.

As the rigidifying elements 30 are arranged only locally on the pressure sensing mat 10, the latter remains generally flexible and may conform to the deformations of the vehicle seat when built in. Given the mechanical reinforcement of the regions of the individual pressure sensors 18, bending and/or torsion mainly occurs in the regions between the individual pressure sensors 18, where there is no rigidifying element 30. Those skilled will note that the mechanical properties (e.g. thickness, modulus of rigidity, modulus of elasticity, etc.) of the rigidifying elements 30 may be adapted so as to achieve a desired mechanical behaviour and haptic properties of the pressure sensing mat 10.

The invention claimed is:

1. A generally flexible pressure sensing mat, comprising
a first carrier foil and a second carrier foil arranged at a certain distance from each other by means of a spacer,
a plurality of cells, each cell being defined by a respective opening of said spacer,
at least two electrodes arranged in each cell between said first and second carrier foils,
wherein, in response to a pressure acting on the pressure sensing mat at a cell, the first and second carrier foils are pressed together, thereby causing variation of an electrical resistance between the at least two electrodes of said cell, wherein
said pressure sensing mat further comprises at least one rigidifying element, said least one rigidifying element being arranged substantially concentrically with a cell in such a way as to locally reduce flexibility of said pressure sensing mat at said cell, the diameter of said rigidifying element exceeding the diameter of said cell by between 5 and 50%.

2. The pressure sensing mat according to claim 1, comprising a plurality of rigidifying elements, each rigidifying element being respectively arranged substantially concentrically with a cell so as to locally reduce flexibility of said pressure sensing mat at said cell.

3. The pressure sensing mat according to claim 1, wherein said at least one rigidifying element is an integral part of said first carrier foil or said second carrier foil.

4. The pressure sensing mat according to claim 1, wherein said at least one rigidifying element is a rigidifying patch attached to said pressure sensing mat.

5. The pressure sensing mat according to claim 4, wherein said at least one rigidifying patch is at least partially formed of a material chosen from a group consisting of a stiff plastic foil, a resin, a glue, a sealing, a metal, an alloy, a composite material.

6. The pressure sensing mat according to claim 4, wherein said at least one rigidifying patch is attached to the first carrier foil or the second carrier foil on an inside of said cell.

7. The pressure sensing mat according to claim 4, wherein said at least one rigidifying patch is attached to the first carrier foil or the second carrier foil on an outside of said cell.

8. The pressure sensing mat according to claim 2, wherein said rigidifying elements are an integral part of said first carrier foil or said second carrier foil.

9. The pressure sensing mat according to claim 2, wherein at least one of said rigidifying elements comprises a rigidifying patch attached to said pressure sensing mat.

10. The pressure sensing mat according to claim 2, wherein said rigidifying patch is at least partially formed of a material chosen from a group consisting of a stiff plastic foil, a resin, a glue, a sealing, a metal, an alloy, a composite material.

11. The pressure sensing mat according to claim 2, wherein said rigidifying patch is attached to the first carrier foil or the second carrier foil on an inside of said cell.

12. The pressure sensing mat according to claim 2, wherein said rigidifying patch is attached to the first carrier foil or the second carrier foil on an outside of said cell.

* * * * *